United States Patent [19]

Mercier

[11] 4,132,978
[45] Jan. 2, 1979

[54] SYSTEMS FOR RECOGNIZING PRINTED CHARACTERS

[75] Inventor: Denis L. Mercier, St Georges, Loire, France

[73] Assignee: Compagnie Internationale pour l'Informatique Cii-Honeywell Bull, Paris, France

[21] Appl. No.: 815,280

[22] Filed: Jul. 13, 1977

[30] Foreign Application Priority Data

Jul. 15, 1976 [FR] France .................................. 76 21670

[51] Int. Cl.² .............................................. G06K 9/00
[52] U.S. Cl. ................... 340/146.3 ED; 340/146.3 D
[58] Field of Search ........... 340/146.3 ED, 146.3 AH, 340/146.3 D, 146.3 AQ, 146.3 R

[56] References Cited

U.S. PATENT DOCUMENTS

| 3,263,216 | 7/1966 | Andrews | 340/146.3 ED |
| 3,533,068 | 10/1970 | Hanaki et al. | 340/146.3 AH |
| 3,641,495 | 2/1972 | Kiji | 340/146.3 ED |

Primary Examiner—Leo H. Boudreau
Attorney, Agent, or Firm—Cameron, Kerkam, Sutton, Stowell & Stowell

[57] ABSTRACT

A system and method are disclosed for character recognition of characters disposed upon a document. Initially, a set of characters on the document is read to obtain corresponding information data, and their associated error codes and the data are stored in a first of N zones of a memory of the system. If an examination of the error codes so stored indicates that at least one character is erroneous, the set of the characters of the document is re-read under differing reading conditions and the new corresponding information data and associated error codes are derived and stored in different memory zones of the memory for as long as at least one erroneous character is detected. A correcting sequence is initiated when a number N of reading operations corresponding to the number of memory zones has been performed and at least one character is recognized as being erroneous; the correcting sequence includes checking the error code associated with the information data read from the first address of the first memory zone of the memory to determine whether there has been an erroneously-read character. If an error is detected, the readout of data from the same address in the next memory zone is effected, while if an error has not been detected, a readout of information data from the next address in the same memory zone is effected. If no error is detected, the information data is read out and stored in a data buffer, while, on the other hand, the document is rejected if the information data as derived from the last address of any one of the N memory zones of the memory proves to be erroneous.

11 Claims, 5 Drawing Figures

SYSTEMS FOR RECOGNIZING PRINTED CHARACTERS

REFERENCE TO RELATED COPENDING APPLICATIONS

Reference is hereby made to the following, copending related applications, each assigned to the assignee of this invention:

U.S. patent application Ser. No. 790,803, filed Apr. 27, 1977 now U.S. Pat. No. 4,096,472 in the name of Dennis L. Mercier; and U.S. patent application Ser. No. 631,998, filed Nov. 14, 1975 now U.S. Pat. No. 4,042,807.

BACKGROUND OF THE INVENTION

Field of the Invention

The present invention relates to improvements in systems for recognising printed characters.

State of the Prior Art

Known systems operate by scanning the characters to be recognised using reading means which are adapted to the kind of character involved. From these reading means there is generally obtained coded information which can be used as a basis for recognition, this information being in a format, which bears a direct relationship to the configuration of the characters concerned. The improvements which are the subject of the invention are applicable to any kind of printed character which, when read by known recognition systems, produces coded information which can be handled by logic circuits, that is to say which can be binary coded. At the present time, widespread use is made of characters composed of vertical lines, and the invention is particularly applicable to the recognition of these characters. An arrangement for analysing characters of this kind is described in U.S. Pat. No. 3,309,667, which was filed Apr. 17, 1961 by the assignee of this invention. This arrangement is particularly suitable for analysing characters which are printed in a magnetisable ink on a record carrier, which may be a bank check.

Character recognition systems generally include checking devices which enable the correctness of the characters read to be verified. However, it does happen that faults occur in the printing of the characters and in the document itself which carries the characters. When this is the case, the reading may be false and may result in characters being needlessly rejected by a checking device which is incapable of distinguishing between a genuinely erroneous character and an inking or paper fault.

Improvements in systems for recognising printed characters, which are described in U.S. patent application Ser. No. 790,803, which was filed on Apr. 27, 1977 by Denis L. Mercier, enable this drawback to be overcome. In effect, they consist of means which enable allowance to be made for a relative variation in inking deficiencies or false over-inking due to the presence of faults in the support for the characters, in relation to a mean inking which is defined as being that of a reference character. By using these means it is possible to re-read a document a number of times under different conditions unit, at the end of one reading operation, no error has been detected in the characters read. By thus varying the reading conditions it is possible to recognise as satisfactory a character which was recognised as unsatisfactory when the document was read previously.

However, the operation of reading the same document cannot be repeated a large number of times without causing an inconvenient and excessive increase in the time allowed for character recognition during data processing and in the number of handling operations which the document undergoes.

SUMMARY OF THE INVENTION

One of the objects of the present invention is to enable the characters on a document to be properly recognised by means of a relatively small maximum number of re-reading operations performed on the document.

Among the possible reading errors there are those which are due to faults in the paper located between the characters to be recognised.

When this is the case it may happen that the recognition system reads a plurality of characters which follow one another on the document without a break, resulting in coded information which represents not a single character, but a plurality of characters actually read by the system.

Another object of the invention is to take into account the number of characters actually read in each time span which would normally correspond to a single character being read.

Another object of the invention is to avoid rejecting a document which has been read as unsatisfactory a number of times, by extracting the characters which are recognised as satisfactory at each reading.

In accordance with the invention, improvements in systems and methods for recognising printed characters which include means for repeat reading which are connected to means for reading documents and to a buffer store of the system, these repeat reading means being designed:

to store in a first memory zone the items of information read during a first reading of the document, and the associated error codes resulting from checking these items of information, to check whether an examination of all the error codes stored in the first zone does not result in at least one character being recognised as erroneous, to repeat the reading of the document under different respective reading conditions, and to store the items of information and associated error codes resulting from each operation of reading the document in different memory zones as long as at least one erroneous character is detected in the course of a reading operation, neither the number of operations of reading the document nor the number of storage operations exceeding a given total number equal to the number N of memory zones, characterised in that they also include means for correcting reading which effect readings of a maximum of m given addressable locations in each of the N memory zones and which are designed:

to begin reading out from memory at the first address of the first zone by means of a signal for initiating a correcting sequence which is generated when an $N^{th}$ operation of reading the document has taken place with at least one read character recognised as erroneous, to check whether an examination of the error code associated with the item of information read from the first address of the first zone does not result in the detection of an error in the read character, to repeat the memory read-out from the same address in the next zone and from the next address in the same zone, respectively if an error has and has not been detected by examining the error code associated with the item of information read-out previously, to halt the memory read-out at the $m^{th}$ address of a zone other than the $N^{th}$ zone and at the $m^{th}$ address of the $N^{th}$ zone, respectively if no error is detected in the item of information read out from this latter address, and irrespective of the result of examining the error code associated with this item of information, to make use of the items of information which are read-out and transferred to the buffer store if no error is detected by examining their associated error codes, to reject the document and the items of information transferred to the buffer store only if the item of information read from, in the extreme case, the $m^{th}$ address of one of the N zones is erroneous.

BRIEF DESCRIPTION OF THE DRAWINGS

Other features of the invention and the manner in which it is put into effect will become apparent from the following description, in conjunction with the accompanying drawings which show.

DETAILED DESCRIPTION OF THE PREFERRED EMBODIMENTS

Figure 1:
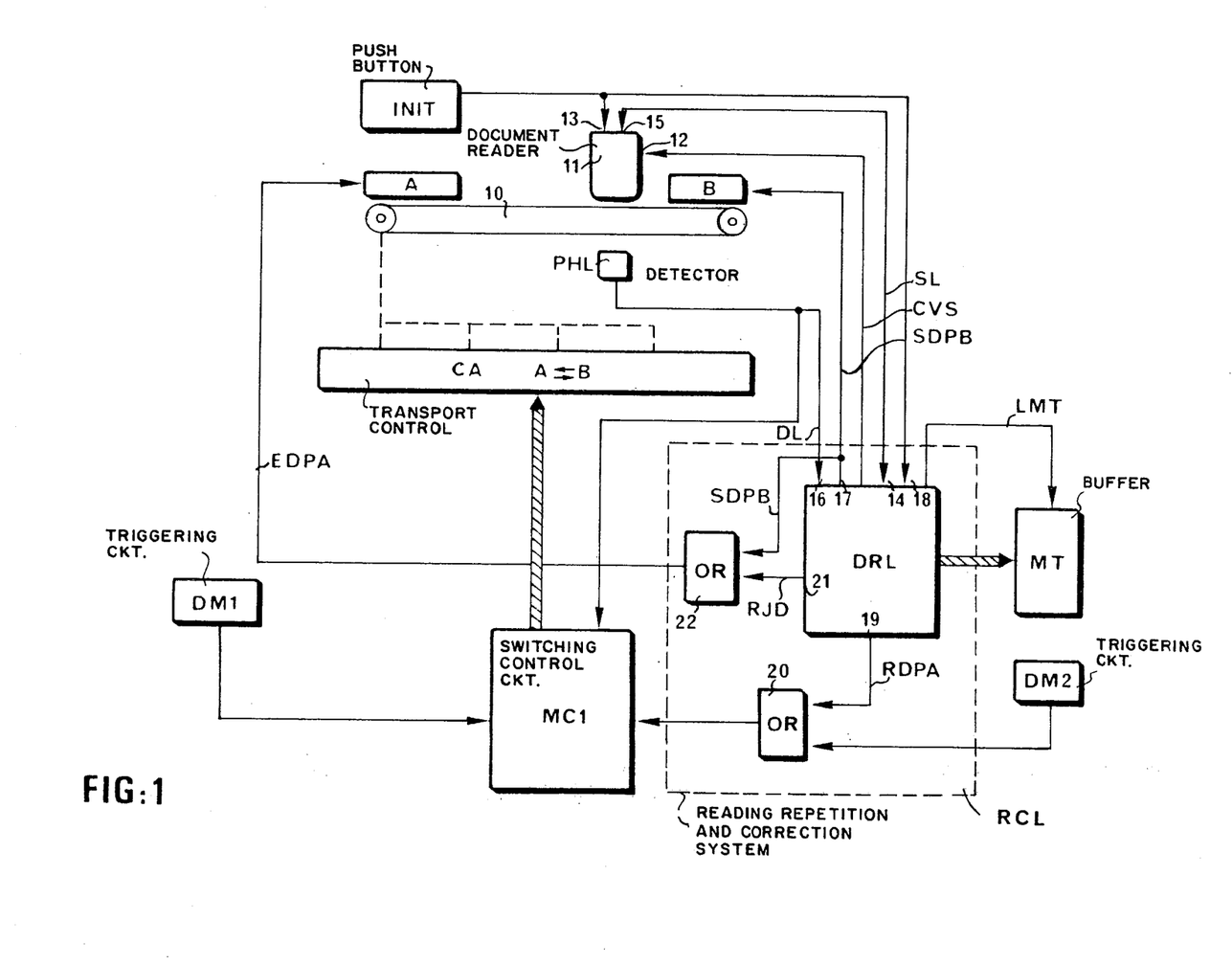
FIG. 1, a general diagram of an improvement according to the invention to a system for recognising printed characters, which is formed by an arrangement for reading repetition and correction and the interconnections between this arrangement and other parts of the system, FIG. 2, a functional diagram of the arrangement according to the invention shown in FIG. 1 for reading repetition and correction, FIG. 3, a flow chart for the main functions performed by the reading repetition and correction arrangement shown in FIGS. 1 and 2, FIG. 4, a detailed diagram of a memory circuit and its addressing circuits which are contained in the reading repetition and correction arrangement of FIGS. 1 and 2, FIG. 5, a detailed diagram of other parts of the reading repetition and correcting arrangement of FIGS. 1 and 2.

FIG. 1 shows an improvement according to the invention to a system for recognising printed characters, formed by a reading repetition and correction system RCL and its interconnections with parts of a system such as described in U.S. patent application Ser. No. 631,998, which was filed by Societe Honeywell Bull on Nov. 14, 1975. In FIG. 1, these parts include a mechanism for transporting documents along a track 10 situated between two stations A and B. Station A is used to insert the documents one by one into the system to enable them to be processed by it, and station B enables the document to be withdrawn when the processing has been completed. A document reader 11 position above the track 10 along the path of a document between the two stations enables the characters printed on the document to be read one by one as the document moves along the track 10. For each character read, the reader 11 generates a series of signals which form a binary code for an item of information resulting from the reading of the character concerned, with which are associated signals forming an error code which is the result of a check which is performed by reader 11 on the binary coded item of information obtained. In an illustrative application of the invention, each character is formed by seven lines which are arranged relative to one another in accordance with a so-called "two from six" code, that is to say they are spaced apart with two long intervals and four short intervals. The reading of such a character, if it takes place properly, results in a six-bit item of coded information, each 0 or 1 bit being associated with a short or long interval which is detected by the reader 11 between the leading (or trailing) edges of two lines situated next to one another. By known means which are described for example in French patent No. 1,295,497, the device 11 performs a check on the read character, such as to enable it to generate a two-bit error code for example, by checking: the total number of intervals (or lines) in the character, whether the six-bit coded information is the same when the long and short intervals are detected from the leading and trailing edges respectively, and whether the read character, which should normally contain two long intervals, meets probability conditions. The error code generated by reader 11 is for example such that: a 00 combination of the two bits represents a satisfactory character, a 10 combination of the two bits represents a read character containing a number of lines less than seven, and an 01 combination of the two bits represents a read character containing at least eight lines. A 11 combination represents either results which differ when reading respectively is from the trailing and leading edges of the lines, or a read character which is improbable because the number of long intervals in it is other than two. When the document, as it is moved along the track 10, reaches the reading position under device 11, a detector PHL shown in FIG. 1 emits a signal DL to mark the beginning of reading. A transport control CA connected to the transport mechanism enables the track 10 to be controlled to cause it to move from station A towards station B or vice versa. Thus, a document inserted at station A may be moved towards station B and then returned towards station A by a command from control CA. Two triggering circuits DM1 and DM2 enable energising signals to be generated which, via a switching control circuit MC1, brings the control circuit CA into operation to cause the mechanism for transporting the document to move respectively from station A to station B and vice versa.

When detector PHL produces the signal DL for the beginning of the reading of the document, this signal is transmitted to circuit CA via switching circuit MC1 so as to trigger a step-by-step advance by the document under the reader 11 at a rate commensurate with an operating cycle of the device, in which the characters are read one by one. Means incorporated in reader 11, which are not shown in FIG. 1, are designed to vary the threshold level applied to an amplitude discriminating circuit, such as that which is described in U.S. Pat. No. 3,286,223, by varying the characteristic impedance of the circuit which amplifies the read signal. In accordance with the invention, this impedance is varied from a mean value which allows a reference character, that is to say one whose inking density is known, to be read. Starting from this initial value, each time the reading repetition and correction system RCL emits a signal CVS to bring about a change in threshold, the value of the said impedance will be altered to a new value from amongst N given values. A series of CVS signals emitted by arrangement RCL cause the value of the impedance to be changed, in a pre-established order, each time the reading operation is repeated in such a way that the value is altered when the document is again in the reading position under reader 11, that is to say when detector PHL emits a new signal DL. The change in the threshold level may thus be brought about by fresh action by an operator on the impedance or by any other known automatic means which are triggered by the CVS signals transmitted to input 12 of reader 11.

The document to be processed having seen inserted at station A and set in motion along the track 10 towards station B by a command which may be given by means of a push-button INIT for example, reader 11 and system RCL are initialised by their respective inputs 13 and 14. When the reader 11 sees the first line of the first character to be read from the document pass by, it begins to read the character and, from its output 15 connected to the system RCL, it generates in succession sets of read signals SL which form an eight-bit code which represents each character read and its associated error code. Each set of signals is separated from the next by a signal longer than the preceding ones, which is emitted from output 15 for a period corresponding to the very long interval which separates two successive characters on the document. The first signal transmitted by output 15 to the system RCL is preceded by the signal DL which is transmitted by detector PHL to input 16 of the system RCL. If, when the reader 11 has completed one reading of the document, none of the various error codes transmitted to the system RCL has shown an error to have been detected, the latter transmits from its output 17 a control signal SDPB to station B, where the document is fed out. From output 18 of the system RCL, a signal LMT is transmitted to a buffer store MT connected to the system RCL to enable it to store all the six-bit codes (representing the various characters read from the document) which are transferred in succession from the system RCL. If, on the other hand, at least one error is detected by the system RCL from one of the various error codes associated with the characters read from the document by reader 11, a signal RDPA is emitted from output 19 of the system RCL. Via an OR gate 20, which receives respectively at its two inputs either a signal emitted by triggering circuit DM2 or signal RDPA; switching circuit MC1 transmits to circuit CA an order for the document to be moved along the track from station B to station A, which order is given either by an operator or by the system RCL, so that the document can be re-read.

The system RCL is designed to cause a document inserted at station A to be read a given maximum number N of times. The arrangement is also designed to store each of the items of coded information which are produced each time a document is read, a number of times equal to the number of characters actually read in the normal time interval allowed for reading a character. In the case of a character formed by vertical lines, this interval is defined by the length of time between the passage under the reader 11 of the two very long intervals which enclose the character. If, after a document has been read for the $N^{th}$ time, at least one error has been detected by the system RCL, and if the numbers of items of information stored in the course of the N reading operations are not the same, the system RCL generates from its output 21 a signal RJD to order the document to be rejected. Via an OR gate 22 which receives at respective ones of its two inputs either signal SDPB or signal RJD, a control signal EDPA is transmitted to station A, which is thus able to admit a fresh document.

Figure 2:
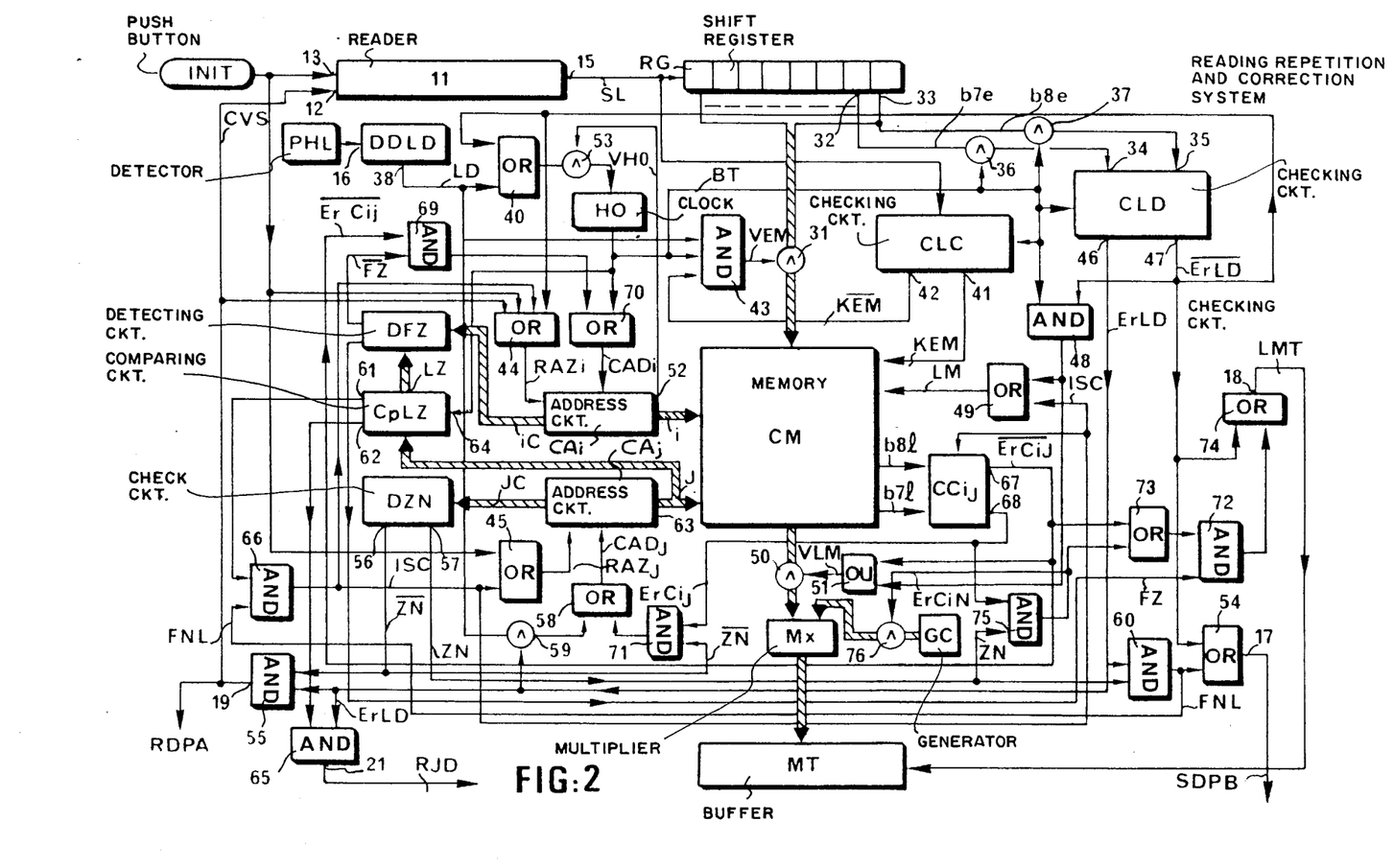

As shown in FIG. 2, the reading repetition and correction system RCL of FIG. 1 includes a shift register RG by which the arrangement is connected to output 15 of the reader 11. This register RG is of the series input parallel output type and has eight information storage locations for the temporary storage of the six bits of coded information representing a read character and the two bits b7e and b8e of the associated error code. A memory circuit CM is connected to the parallel outputs of shift register RG via a transfer circuit 31 which is formed by a set of AND gates, as also are all the others which will be described below. Register RG has two (32 and 33) of its parallel outputs connected respectively of two inputs 34 and 35 of a circuit CLD for checking the reading of the document, to enable the bits b7e and b8e of each error code to be transmitted to it via two transfer circuits 36 and 37. The memory circuit CM is addressed respectively by two circuits CAi and CAJ to allow the items of information which are stored one by one in the shift register RG each time the document is read, to be written into one of the N memory zones contained in the circuit memory CM, and to allow the items of information recorded in one of the N zones, which are to be transferred to the buffer store MT, to be read out. Address circuit CAi is designed to allow the items of information stored in the shift register RG in the course of one of the operations (equal at most to the given number N) of reading the document, to be written into or read out from various respective addresses designated "i" ("i" may vary between the value 1 and a whole-number value m) in any one of the N memory zones. Address circuit CAJ is designed to enable the items of information which are stored in the shift register RG in the course of any operation of reading the document, to be written into or read out of one of the N memory zones, the serial address number of the zone being the serial number of the reading operation which has just been performed on the document. A circuit DDLD, by which input 16 of arrangement RCL is connected to detector PHL, is designed to emit from its output 38 a signal LD that the document is being read when signal DL is at present at its input, that is to say during the whole of the step-by-step progress of the document beneath device 11. A clock circuit HO in arrangement RCL is designed to emit clock signals BT of a given basic frequency which decides the operating cycle of address circuits CAi and CLD, to both of which clock circuit HO is connected.

Clock circuit HO also enables the checking circuit CLD and the transfer circuits 36 and 37 to be validated It also validates a circuit CLC for checking the character read which is connected to output 15 of reader 11. Checking circuit CLC is designed to check the number of characters actually read by the reader 11 during the time normally taken to read a character. It generates a signal kEM at a first output 41 when the number k of characters actually read is at least equal to 1 and a signal $\overline{kEM}$ at a second output 42 when the number k of characters read is not at least equal to 1. As soon as a document is in the reading position, the signal LD, which is generated from output 38 of circuit DDLD, is transmitted to a first input of an AND gate 43. When this gate also receives, at second and third inputs respectively, a signal BT and the signal kEM, it generates from its output a signal VEM to validate the transfer circuit 31. An OR gate 40, one of whose two inputs is connected to output 38 of circuit DDLD, causes the clock circuit HO to come into operation by generating a signal from its output when signal LD is present at its input. At the same time the reader 11 is initialised by the operation of the push-button INIT, the address circuits CAi and CAJ are respectively reset to zero by signals RAZi and RAZJ which come from the respective outputs of two OR gates 44 and 45 which are connected to the push-button INIT.

Circuit CLD is designed to check each error code (given by bits b7e and b8e) which arrives from the shift register RG each time a clock pulse BT is emitted by the clock circuit HO. Since the clock circuit HO is validated during the whole time the document is being read by the signal LD transmitted by gate 40, it follows that during the same interval of time a series of pulses BT are transmitted to circuit CLD, which thus checks all the error codes associated with all the characters read from the document. If at least one error is detected by circuit CLD from the set of error codes, it generates from an output 46 a signal ErLD for an error in the reading of the document. If on the other hand no error is detected, circuit CLD generates from an output 47 is a signal $\overline{ErLD}$ to indicate no errors in the reading of the document. In this latter case, when signal LD is no longer present at output 38 of circuit DDLD (because the most recent operation of reading the document has been completed), gate 40 enables the clock circuit HO to be operated again in response to receipt at a second input of the signal $\overline{ErLD}$ emitted from output 47 of circuit CLD.

The address circuit CAI is thus validated to operate in accordance with a base cycle set by the clock circuit HO, circuit CAI also being reset to zero by the same signal $\overline{ErLD}$ when transmitted to a second input of OR gate 44. Thus, when no error has been detected by the end of a reading operation, the various items of information read from the document and their associated error codes, which have just been rewritten into a zone determined by the address circuit CAJ, are read out from this memory zone of the memory CM, as a result of its various "i" addresses being addressed by circuit CAi. An AND gate 48 whose two inputs are connected to the output of the clock circuit HO and output 47 of circuit CLD respectively, enables a signal to be transmitted to an OR gate 49 when signals BT and $\overline{ErLD}$ are present, to allow read-out from memory CM to take place in response to a signal LM transmitted to the memory CM. The transfer, via a multiplexer Mx, of the information read out to the buffer store MT takes place by means of a transfer circuit 50 which is validated by a signal VLM from the output of an OR gate 51 which also receives the output signal from AND gate 48. The transfer to the buffer store MT continues for as long as the "i" address at the output of the address circuit CAi is less than the given maximum value "m." Only when "i" is different from "m" is a signal VHO generated from an output 52 of the address circuit CAi which is connected to a transfer circuit 53. Circuit 53, which is connected between gate 40 and the clock circuit HO, allows clock circuit HO to be put into operation only when signal VHO is present. When the "i" address is equal to m, the clock circuit HO is stopped as a result of the absence of signal VHO. Also the same signal $\overline{ErLD}$, when transmitted to an input of an OR gate 54, enables the system RCL to generate from its output 17 (that is to say the output of gate 54) the signal DSPB which allows station B to eject the document.

The transfer of the data which has been written into a memory zone in the memory CM and the feed-out of the document from station B are brought about by the system RCL either at the end of the first reading operation performed with a mean threshold level, when the characters on the document have been recognised as satisfactory by circuit CLD, or else subsequently at the conclusion of one of the (N − 1) reading operations (other than the first) after at least one repeat reading brought about by the system RCL. Each repeat reading-results from the presence of signal ErLD at output 46 of circuit CLD. In this case, signal ErLD is transmitted to an input of an AND gate 55, whose other input is connected to an output 56 of a check circuit DZN. Circuit DZN is designed to check whether the Jth zone, in which the information resulting from the most recent reading operation and the associated error codes have been written, is the $N^{th}$ memory zone, and to generate a signal $\overline{ZN}$ (meaning the value of J is not equal to N) at an output 56 and a signal ZN (meaning the value of J is equal to N, i.e. zone ZJ = ZN) at a second output 57. If the most recent reading operation performed is not the $N^{th}$ reading operation, signal $\overline{ZN}$ is transmitted to gate 55 which, when it also receives signal ErLD, generates from its output 19 a signal which causes the document to be read again. This repetition is caused by the signal from output 19 of gate 55, which is transmitted on the one hand to a third input of an OR gate 44, to enable the address circuit CAi to be reset to zero by signal RAZi, and on the other hand to one of the inputs of gate 20 of FIG. 1, to act as the signal RDPA in response to which an order for the document to return to station A is generated at the output of circuit MC1.

By means of the same signal generated at output 19 (referred to as signal CVS in FIG. 1), an order for a change in threshold level is transmitted to input 12 of the reader 11, which commences a new reading operation as soon as the document arrives under it after having been returned to station A and advanced along the track under the control of the triggering circuit DM1 of FIG. 1. A new reading operation having been initiated, the various items of information read from the document, and their associated error codes, are stored at the various "i" addresses in a fresh memmory zone ZJ. This new zone ZJ is addressed by means of the address circuit CAJ, which emits the address J from its output connected to memory circuit CM when it receives a signal CADJ emitted by an OR gate 58. This gate 58 emits signal CADJ, when signal LD is present at that one of its inputs which is connected to circuit DDLD via a transfer circuit 59, which latter is validated by a signal ErLD from output 46. If by the conclusion of an $N^{th}$ reading of the document, the checking circuit CLD has detected at least one error, an order SDPB (for the document to be fed out at station B) is transmitted to output 17 of gate 54 via an AND gate 60, which receives at one input signal ErLD and at another input the signal ZN which is transmitted from output 57 of the checking circuit DNZ. Each time a signal KEM is generated from output 41 of the checking circuit CLC, the item of information and its associated error code (which are stored in register RG) are placed in store a number of times equal to the number K (equal to or greater than 1) of characters actually read, at consecutive "i" addresses in the zone determined by the address circuit CAJ.

Figure 5:
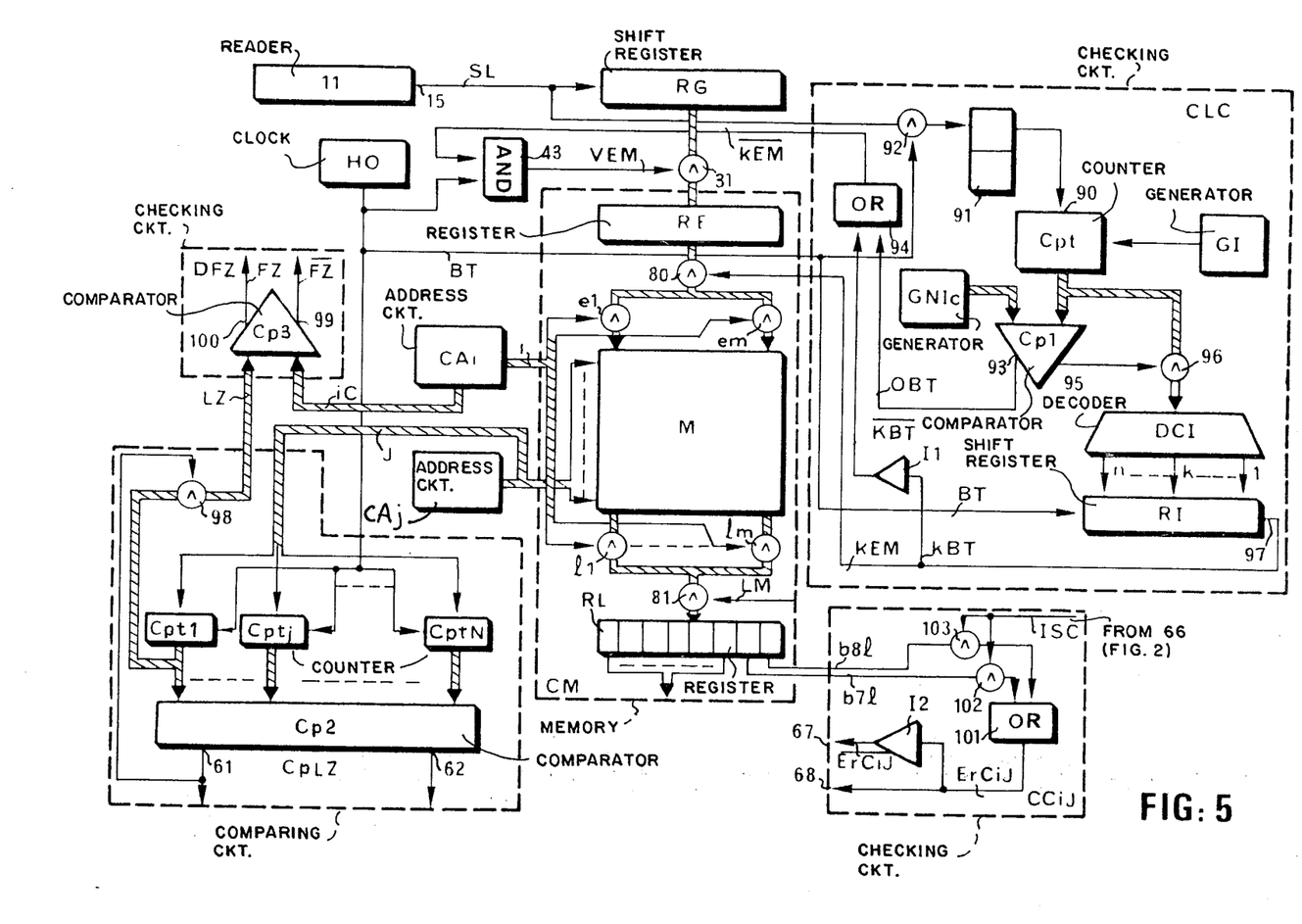

Because of the changes in the conditions of reading which occur each time the document is re-read by the reader 11 because of an error, the number k as defined may undergo changes, that is to say for the same given character on the document the number of characters actually read may vary from one reading operation to the next. Thus, when the document has been read N times, the number of addresses at which items of information (which are first stored in succession in register RG) have been written into the N different zones may vary from one zone to another or else may be the same. A circuit CpLZ, which compares the recorded lengths in the N zones enables a signal to be generated from an output 61 when the numbers of addresses at which writing has taken place are the same in all the N zones, and a signal from an output 62 when these numbers are different. The comparing circuit CpLZ operates on the N different signals emitted from an output 63 of the address circuit CAJ, which corresponds to the N different addresses J of the N memory zones. The signals at outputs 61 and 62 are generated as a function of the numbers of clock signals BT received at input 64 of the comparing circuit CpLZ, as is shown by FIG. 5 below. If the lengths of writing in the N zones are the same, at the same time as a signal is generated at output 61, a signal LZ is transmitted from one of the outputs of the comparing circuit CpLZ, which are connected to an end-of-zone detecting circuit DFZ. This signal LZ indicates the last "i" address at which an item of information (and its error code) is recorded in any one of the N written zones of memory CM. If the lengths of writing in the N zones are different, the signal emitted from output 62 is transmitted to an input of an AND gate 65, which generates from its output 21 (FIG. 1) the signal RJD for the document to be rejected, when there is present at its other input the signal ErLD which is transmitted from output 46 in the event of an error being detected during the $N^{th}$ reading operation by the checking circuit CLD. If, on the other hand, the lengths of writing in the N zones are equal, the signal emitted from output 61 is transmitted to an input of an AND gate 66, which generates from its output a signal ISC to initiate a correcting sequence when a signal FNL transmitted from the output of gate 60 is present at its other input.

The document concerned is fed out from station B in response to the signal SDPB, which is transmitted at output 17 of gate 54 when signal FNL is present at its input, that is to say when at least one error has been detected in the course of the $N^{th}$ reading operation. Any fresh reading operation is thus invalidated as soon as signal ISC has been generated from the output of gate 66 and a correcting sequence has been initiated as a result of this signal being transmitted to another input of the gate 49 which enables the memory CM to be read out in response to the signal LM which is transmitted to memory CM. OR gate 45 resets the address circuit CAJ to zero by means of signal RAZJ, which is transmitted from its output when signal ISC is present at another input. Similarly, when signal ISC is present at an input of OR gate 44, the address circuit CAi is reset to zero by signal RAZi.

A character is thus read from the first address of the first memory zone and its error code, which is given by bits b7e and b8e emitted by memory CM, is checked in a checking circuit CCij. The checking circuit CCiJ is designed to check each character CiJ which is read from the memory CM at an "i" address in zone J ("i" and J being addresses determined by the address circuits CAi and CAJ, which may vary between respective values of 1 and m and 1 and N). If no error is detected from the code given by bits b7e and b8e, a signal $\overline{\text{ErCiJ}}$ is generated from an output 67 of the checking circuit CCiJ. If, on the other hand, the checking circuit CCiJ does detect an error, it emits a signal ErCiJ from an output 68. As a result of signal $\overline{\text{ErCiJ}}$, which is emitted from output 67, the OR gate 51 generates a signal VLM for validating transfer circuit 50, as a result of which character CiJ is transferred to the buffer store MT. Signal $\overline{\text{ErCiJ}}$ is also transmitted to an input of an AND gate 69 which, since it receives a signal $\overline{\text{FZ}}$ from the detecting circuit DFZ at another input, emits from its output a signal which is transmitted to an OR gate 70 which controls the address circuit CAi. The address circuit CAi is thus operated by a signal CADi which is generated from the output of OR gate 70, either while the document is being read by means of the signals BT emitted by circuit HO, or during a correcting sequence by means of each signal emitted from the output of AND gate 69. In the course of a correcting sequence, when a read character CiJ has proved not to be erroneous, the address circuit CAi then causes the character at the next address in the same zone to be read out (that is to say character CA (i+1) J) by increasing the "i" address by one unit. The detecting circuit DFZ is designed to emit signal $\overline{\text{FZ}}$ when the "i" address of the character Cij read out is not that of the last character written in the zone J concerned. On the other hand, the detecting circuit DFZ emits a signal FZ from its other output when the address of the character CiJ read out is the address of the last character in the zone. The signals FZ and $\overline{\text{FZ}}$ result from a comparative check which is performed by the detecting circuit DFZ between each "i" address, which is emitted from the outputs of the address circuit CAi and the last address as given by the signals LZ transmitted by the comparing circuit CpLZ. If an error is detected in the character CiJ read-out, it is not transferred to the buffer store MT and the signal ErCiJ from output 68 of the checking circuit CCiJ actuates the address circuit CAj via the OR gate 58 and an AND gate 71 to which it is connected. The AND gate 71 emits a signal from its output only when signal $\overline{\text{ZN}}$ is present at an input other than that at which it receives signal ErCiJ. Thus, the address circuit CAj is operated by a signal CADj which is generated either by signal LD each time the document starts to be read, or in the course of a correcting sequence by each signal which is transmitted from the output of AND gate 71.

In the course of a correcting sequence, when a character CiJ read-out is erroneous, the address circuit CAj then causes the character at the same address in the next zone (that is to say character CAi (J+1)) of the memory CM to be read out by increasing the J address by one unit. When the end of a zone is reached, signal FZ is transmitted to an input of an AND gate 72 which, since it receives signal ErCiJ at another input via an OR gate 73, transmits a signal to an input of an OR gate 74 as a result of which the latter emits signal LMT from its output 18 (shown in FIG. 1). In this way, OR gate 74 emits the signal LMT which enables the buffer store MT to store either all the characters which have been detected as satisfactory by the end of a reading operation (by circuit CLD whose output 47 is connected to gate 74) or else all the characters, during the correcting sequence, when the last character in a zone has been recognised as satisfactory.

When a plurality of zones have been scanned in the memory CM as a result of errors being detected in the characters CiJ read-out, and when the $N^{th}$ zone has been reached, signal ZN is transmitted to an input of an AND gate 75. In the event of an error being detected in the character CiJ read-out from the $N^{th}$ zone, signal ErCiJ is transmitted to another input of gate 75, which generates from its output a signal ErCiN to indicate not only that the character at address i in the $N^{th}$ zone is erroneous but that so too are all the preceding characters at the same address "i" in the other (N − 1) zones. This being the case, signal ErCiN is transmitted to a transfer gate 76 to validate it and to enable it to transfer a given code originating from a generator GC to the buffer store MT via multiplexer Mx. Signal ErCiN is also transmitted to OR gate 74, via gates 73 and 72, to enable the said given code to be stored in the buffer store MT. In the course of the correcting sequence all the satisfactory characters are transferred to the buffer store. When the last character read from a zone has proved satisfactory, the characters transferred to the buffer store MT are stored in it as also is the given code when the character read from the $N^{th}$ zone is erroneous.

FIG. 3 shows how the various functions which are performed by arrangement RCL and which make up the correcting sequence are linked to one another and gives a better under-standing of the method of operation of this arrangement in the form in which it is shown in FIG. 2, from the moment when the correcting sequence is initiated. The memory in circuit CM is then validated to read out a first eight-bit item of information consisting of a six-bit character CiJ and its associated error code which is given by the bits b7e and b8e of FIG. 2, each combination b7e and b8e normally being the same as the combination b7e and b8e which is written in store at the same i address in the same zone J. The first item of information is read at an address "i" equal to 1 (1 being the initial address of all the zones) in zone Z1 (which is the first of the N zones). The character C11 is checked by means of the bits b7e and b8e of its associated error code which are transmitted to circuit CCiJ. If satisfactory, character C11 is transferred to the buffer store MT. If unsatisfactory, the character at the same address 1 in the next zone Z2 is read. Character C12 is checked by means of its error code and if satisfactory is transferred to the buffer store. If unsatisfactory, the character at the same address 1 in the next zone Z2 is read. If, after a plurality of scans involving a plurality of addresses in zones and a plurality of zones, address 1 of zone J is reached, character CiJ is checked inthe same way as characters C11 and C12 by means of its error code which is transmitted to circuit CCiJ. If this character CiJ is satisfactory it is transferred to the buffer store and the character at the next address i + 1 in the same zone J is read. If character CiJ is unsatisfactory, it is not transferred to the buffer store if zone J is not the $N^{th}$ zone and the character at the same address i in the next zone J + 1 is read. When the character CiJ being checked is the last stored in zone ZJ the characters to be transferred to the buffer store have all been stored in it.

Figure 4:
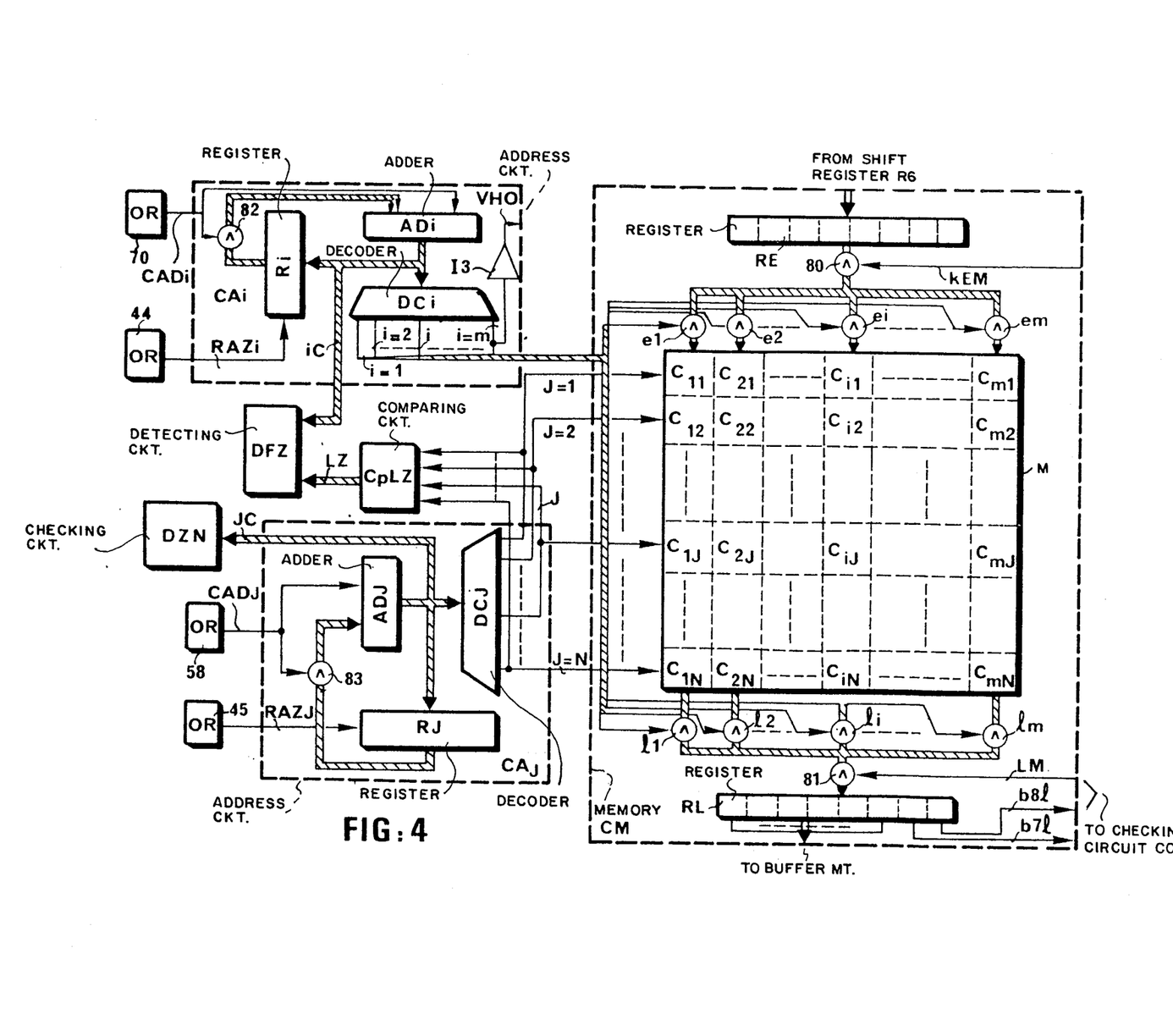

FIG. 4 is a detailed diagram of the memory circuit CM and the addressing circuits CAi and CAJ. Circuit CM consists of a memory M containing N zones of which zones Z1, Z2, ZJ, and ZN are shown in FIG. 4. Circuit CM also includes two registers RE and RL intended for the temporary storage of the eight-bit items of information which are to be respectively read into and out of the memory M. By means of a transfer circuit 80 which is validated by the signal kEM emitted by the checking circuit CLC of FIG. 2, each item of information from the shift register RG of FIG. 2 is transferred from register RE to one of the m addresses in the memory zone. If the numer k is equal to 1, the item of information is stored at a single address in a zone, as determined by the address circuits CAi and CAJ. If the number k is greater than 1, the item of information is stored at a number of consecutive addresses equal to k. By means of a transfer circuit 81 which is validated by the signal LM emitted from the output of OR gate 49 of FIG. 2, an item of information stored at an address and zone determined by the address circuits CAi and CAJ is transferred to register RL. Register RL has six storage locations which are connected to the buffer store MT by the transfer circuit 50 of FIG. 2, and two storage locations which are connected to the checking circuit CCij to enable the bits b7e and b8e shown in FIG. 2 to be transmitted to it.

The address circuit CAi comprises a register Ri, an adder ADi and a decoder DCi. Register Ri is reset to zero by the signal RAZi generated by the OR gate 44. A first signal CADi transmitted from gate 70 causes the content (zero) of register Ri to be transmitted to adder ADi via a transfer circuit 82 and to be incremented by one binary unit as a result of signal CADi also being transmitted to another input of adder ADi. The binary coded result of the addition is transmitted on the one hand to register Ri and on the other hand to the decoder DCi, which generates a signal at one of its m outputs, these outputs corresponding to respective ones of the "i" address values from 1 to m. Each fresh signal CADi causes the adder ADi to calculate the next i address by incrementing the last address calculated by one unit. Thus, in FIG. 4, signals are successively generated at the outputs $i = 1, i = 2, \ldots i, \ldots i = m$, thus enabling the transfer circuits e1, e2 . . . ei, em and 1 1, 1 2, . . . 1 i . . . 1 m respectively to be validated either for the purpose of writing into memory M the items of information which arrive in succession from register RE, or for the purpose of reading out from register RE the items of information to be stored in succession in register RL, writing and reading being validated by signals kEM and LM respectively. The signal VHO of FIG. 2 is generated at the output of an inverter I3 connected to output $i = m$.

The address circuit CAj is made up of a register RJ, an adder ADJ and a decoder CDJ. The operation of the address circuit CAJ is similar to that of circuit CAi. Register RJ is reset to zero by the signal RAZJ which is generated by the OR gate 45. As a result of a first signal CADJ emitted by the OR gate 58, the content (zero) of register RJ is transmitted to the adder ADJ via a transfer circuit 83 and is incremented by one binary unit as a result of signal CADJ also being transmitted to another input of the adder ADJ. The binary coded result of the addition is transmitted on the one hand to register RJ and on the other hand to decoder DCJ, which generates a signal from one of its N outputs, these outputs corresponding to respective ones of the J zone values from 1 to N. Each fresh signal CADJ causes the adder ADJ to calculate the next address J by incrementing the last address calculated by one unit. Thus, in FIG. 4, signals are successively generated at outputs $J = 1, J = 2 \ldots J \ldots J = N$, thus enabling transfer circuits (not shown in FIG. 4) similar to circuits e1, e2, ei, em and 1 1, 1 2, li lmm to be validated for the purpose of enabling items of information to be respectively written into and read out of the N memory zones. FIG. 4 shows in particular the characters C11, C21, Cil, Cml, the characters C12, C22, Ci2, Cm2, the characters CiJ, C2J, CiJ, CmJ and the characters CiN, C2M, CiN, CmN, which are stored at addresses 1, 2, i, and m respectively in zones Z1, Z2, ZJ, ZN of memory N. Also shown in FIG. 4 are the circuits DZN, CpLZ and DFZ together with their connections to the address circuits CAi and CAJ.

FIG. 5 is a detailed diagram of the checking circuits CLC and CCiJ, of comparing circuit CpLZ and of checking circuit DFZ. So as not to encumber the Figure, not all the connections between the various circuits shown in FIG. 2 have been included in FIG. 5. The checking circuit CLC in FIG. 5 contains a counter Cpt which is connected by an input 90 to a flip-flop 91 of which a single input is connected, via a transfer circuit 92 which is validated by signals BT, to the output of the reader 11 for the series of signals SL. When the very long interval which precedes a character passes as a character begins, this causes a change of signal at the output of the reader 11 and this in turn changes the state of flip-flop 91, when a signal BT emitted by circuit HO is present. This change in the state of flip-flop 91 enables a control signal to be transmitted to input 90 of counter Cpt, which thus begins to count the pulses at the given basic frequency signal, which is emitted by a generator GI. A fresh change of signal in the opposite direction at the output of device 11 indicates the end of the operation of reading the character concerned and the beginning of a new very long interval. As a result of faults in the paper at the point where this very long interval (and possibly the following intervals) is situated, the reader 11 may in fact go on to read a plurality of characters with no changeover at its output to indicate the transition from one character to at least one other which follows it. Because of this, counter Cpt continues to count the pulses emitted by generator GI beyond the number representing one character actually read. Counter Cpt is only stopped when flip-flop 91 changes its state and ceases to emit a signal from its output, which happens when a very long interval detectable by the reader 11 appears.

The number of pulses which have then been counted by circuit Cpt is compared to a given number of pulses NIc corresponding to the length of one character actually read. A comparator Cp1 contained in the checking circuit CLC allows this comparison to be made by means of two groups of inputs which are connected on the one hand to counter Cpt and on the other hand to a generator GNic in circuit CLC. A number k is defined as being the ratio of the number of pulses counted by counter Cpt to the number NIc. If k is less than 1, a signal OBT is transmitted from an output 93 of comparator Cp1 and passed to an input of an OR gate 94 in the same circuit CLC. In response to this signal at its input gate 94, the OR gate 94 generates a signal $\overline{kEM}$ at its output and this signal is transmitted to an input of AND gate 43, which, when a signal BT is present at another input, generates a transfer signal VEM by means of which a new item of information stored in register RG can be transferred to memory M. If k is at least equal to 1, a signal is emitted from an output 95 of comparator Cp1 and the coded number of pulses counted by counter Cpt is transmitted to the inputs of a decoder DC1 in circuit CLC via a transfer circuit 96. The decoder DC1 has a number n of outputs which is statistically determined to be in all cases greater than the number k of characters actually read in the event of possible errors. Depending upon the value of k, a signal is transmitted from the appropriate output of decoder DC1 and is transmitted to one of the n parallel inputs of a shift register RI. Register RI operates in response to the signals BT, which it receives at an input connected to the clock circuit HO, and generates from its output 97 a series of k signals BT on receiving a signal from the decoder DC1 at its $k^{th}$ input. The series of signals, which is marked kEM in FIGS. 2 and 4, enables the information stored in register RE of FIG. 4 to be stored k times as a result of circuit 80 being validated k times to the time base supplied by BT. In the present case, where k is at least equal to 1, the series of signals kBT is transmitted to an inverter I1 in circuit CLC, as a result of which no signal reaches the gate 94 connected to this inverter for a period of time equivalent to kBT. During this period AND gate 43, which fails to receive signal $\overline{kEM}$ at one of its inputs, does not emit the signal VEM in response to which a fresh item of information can be transferred from register RG to register RE.

The comparing circuit CpLZ contains a set of N counters of which counters Cpt1, CptJ and CptN are shown in FIG. 5. These counters are controlled by the signals which are emitted from respective outputs of the address circuit CAJ, these output representing the addresses of the N zones of the memory CM. As dictated by the zone address determined by the address circuit CAJ, a signal is transmitted to the appropriate counter Cpti to CptN, such as counter CptJ in the case of address J. As long as the counter concerned is receiving the signal from the corresponding output of the address circuit CAJ, it counts signals BT emitted by the clock circuit HO. When N reading operations have been performed on the document, the N counters in the comparing circuit circuit CpLZ emit from their outputs the respective coded numbers of signals BT which they have each counted in the course of the N reading operations. These numbers are transmitted in the form of binary combinations to n groups of inputs of a comparator Cp2, which emits a signal from output 61 when these numbers are equal, that is to say when the numbers of addresses in the N zones at which information has been written are all the same. If on the other hand these numbers are different, a signal is emitted from output 62 of comparator Cp2 and the combination of signals LZ representing the number counted by one of the counters, counter Cpt1 for example, is transmitted to the clocking circuit DFZ by a transfer circuit 98 which is validated by the signal emitted from output 61 of comparator Cp2.

In the checking of circuit DFZ, the combination LZ is compared with the coded address iC generated by the address circuit CAi. As long as the value iC is less than the value LZ, a comparator Cp3 contained in the checking circuit DFZ generates from an output 99 the signal $\overline{FZ}$, which is transmitted to the AND gate 69 (see FIG. 2). When the value iC becomes equal to the value LZ, comparator Cp3 generates from an output 100 the signal FZ, which is transmitted to the AND gate 72 (see FIG. 2).

In FIG. 5, the checking circuit CCiJ contains an OR gate 101 whose two inputs are connected to respective ones of two locations of the register RL, from which it receives the bits b7e and b8e via two transfer circuits 102 and 103 which are validated by signal ISC. Circuit CCiJ also contains an inverter I2 whose input is connected to the output of the OR gate 101. By convention, if there is no error, bits b7e and b8e are equal to 0.

Character CiJ is erroneous if at least one of the two bits is equal to 1 and in this case ErCiJ is generated at the output of the OR gate 101. If there is no error, signal $\overline{ErCiJ}$ is generated from the output of inverter I2.

The embodiment of the invention shown in FIGS. 1, 2, 4 and 5 can be applied with particular benefit to the recognition of characters made up of seven vertical lines. As a result of errors due in particular to ferrous inclusions in the paper, it is possible for the reading device to read more than seven lines rather than the seven lines representing one character. The checking circuit CLC enables this particularly troublesome type of error, which cannot be detected by other known systems, to be detected and to be allowed for by storing the information read as many times as there are characters actually read. In the event of an error, since the document can be re-read a number of times by the reading device under differend conditions, it follows that the items of information stored in the various memory zones may be different and that certain items of information which are initially detected as erroneous may, at other locations in the memory, be detected as satisfactory by circuit CCiJ. The correcting sequence which is performed by the means employed in the invention enables single satisfactory characters to be recovered from among all the characters read in the course of each operation of reading the document and in this way a set of usable characters to be assembled representing all the characters on a document, which would otherwise have been rejected after only one reading.

I claim:

1. A method of operating a data process system for recognizing characters disposed upon a document, the data processing system including a document reader, a memory having a plurality of N memory zones, each memory zone having up to a maximum of m addressable locations and a buffer store, said method comprising the steps of:
   (a) conducting a first reading of the document by operating the document reader to read a set of characters to obtain information data, as the document is moved with respect to the document reader;
   (b) checking the information data derived from the document reader and providing associated error codes with respect to this information data;
   (c) storing in a first memory zone of the N zones the information data obtained during the first reading of the document and the associated error codes resulting from checking this information data;
   (d) checking the error codes stored in the first zone to determine whether at least one character of the characters read during the first reading, is erroneous;
   (e) conducting repeated readings of the set of characters under different respective conditions, and storing the new information data and associated error codes resulting from each of the repeated readings in corresponding, different memory zones of the memory for as long as at least one erroneous character is detected in the course of a reading operation, each of the number of repeated readings of the document and the number of storage operations in the memory being not greater than N;
   (f) initiating a correcting sequence when the Nth reading operation of the document has been performed, including the substeps of:
      1— reading out data information from the first addressable location of the first memory zone of the memory;
      2— examining the error code associated with the data information read from the first addressable location of the first memory zone to determine whether the associated character is erroneous;
      3— repeating the reading out of the associated error code from the same address in the next successive zone of the memory if an error is detected by reviewing the associated error code, and for repeating the reading from the next address in the same zone if an examination of the associated error code indicates that an error has not been detected;
      4— terminating the reading out of data information from the memory at the Mth address of a memory zone other than the Nth zone, and at the Mth address of the N zone, respectively, if no error is detected in the information data read from the latter address, and transferring the data information read out from the memory, if a checking of the error code indicates no error to the buffer store; and
   (g) rejecting the document and the items of information transferred to the buffer store if the data information as obtained from the Mth address of one of the memory zones is erroneous.

2. The method as claimed in claim 1, wherein the character reader reads out characters in a series and an error code associated with the serially read-out characters is generated in a serial fashion, further comprising the steps of:
   (a) checking each error code associated with the information data to be written into a memory zone to determine the number k of characters read by the document reader;
   (b) checking the number k to determine whether k is at least equal to "1;"
   (c) if k is at least equal to "1," storing the information data k times at different addresses in a memory zone;
   (d) if the checked number k is less than "1," preventing the storing of the data information in the memory;
   (e) comparing the numbers of addresses in respective memory zones of the N zones from which information data is read out and their associated error coders, when the document has been read for the Nth time and at least one character has been indicated to be erroneous;
   (f) rejecting the document when the compared numbers are different;
   (g) initiating a correcting sequence when the numbers of addresses in the N zones are the same;
   (h) the correcting sequence comprising the substeps of checking whether the address in a memory zone from which information data is read is the last address of that memory zone, and transferring to the buffer store the data information from its memory zone if this is other than the Nth memory zone, in the case where no error has been detected in the data information, and transferring a given error code to the buffer store in the case where an error has been detected in the item of information read from the Nth memory zone of the memory, and terminating the reading from the memory if the address in the Nth zone from which the information data is read out is the last address in this zone.

3. In a data processing system for recognizing printed characters on a document, comprising:
   (a) means for reading a set character printed on the document moved with respect to said reading means to obtain corresponding information data;
   (b) memory means comprising N addressable memory zones, each memory zone having a plurality of m addressable locations therein;
   (c) buffer store means coupled to receive data read out from said memory means;
   (d) first and second addressing circuits for addressing a selected location within a selected zone;
   (e) a clock circuit for providing a clock signal;
   (f) checking and repeat reading means for examining the readout information data for detecting erroneous characters, for repeating the reading of a document under different respective reading conditions, and for storing the information data of the repeated readings and the associated error codes resulting from the repeated readings in different memory zones of said memory means, said checking and repeat reading means comprising:
      1—character reading checking means responsive to the information data from said reading means and to receive the clock signal, for checking each read character in the set of characters to determine that only one character is read, and for generating a first error signal if at least one character is not read by said reading means and a second signal in the form of k clock signals as derived from said clock means if said reading means has read a number k of characters equal to at least "1;" and
      2—means responsive to the first error signal for preventing data corresponding to an erroneously-read character from being transferred to said memory means, said memory means responsive to the k clock signals for receiving the information data read out by said reading means and its associated error codes to be stored k times within said memory means at different memory addresses as determined by said first and second address circuits.

4. The data processing system as claimed in claim 3, wherein said checking and repeat reading means further comprises zone length comparator means responsive to the clock signal and to the output of said second addressing circuit for identifying said memory zones in which data has been written, for generating a first signal if the number of addresses in the N zones at which read data is stored and the associated error codes have been written are equal, and a second signal if the number of N zones corresponding to the read data and associated error codes are different.

5. The data processing system as claimed in claim 4, wherein said checking and repeat reading means further comprises means for determining the number of the repetitive reading operations for providing an output indicative of the number of such re-reading operations, and a first gate responsive to the first signal of said zone length comparator means and to the output of said determining means indicating the Nth operation of re-reading, for providing an initiate signal commencing a correcting sequence.

6. The data processing system as claimed in claim 4, wherein said checking and repeat reading means comprises a circuit for checking characters coupled to said locations of said memory means wherein each error code associated with the information data item is stored, for generating a first signal if no error is detected in the error code and for generating an error signal if an error in the error code is detected, transfer means responsive to the first signal for transferring of the information data of the associated error code and for actuating said first address circuit to read out the information data stored at the next address in the same memory zone of said memory means, said transfer means responsive to the second signal for preventing the transfer of the information data corresponding to the checked error code and for actuating said second addressing circuit to read out the information data stored at the same address in the next memory zone of said memory means.

7. The data processing system as claimed in claim 6, wherein said means for checking and repeat reading means further comprises end-of-zone detector means responsive to the coded addresses derived from said first addressing circuit and to the first and second signals of said zone length comparator means for providing a first signal if the address in said memory zone is not the last address at which information data is written in this memory zone, and a second signal if the address of this memory zone from which the information data readout takes place is the last address, said first address circuit responsive to the first signal of said end-of-zone detector means for providing an encoded address corresponding to the next address in said memory zone, said transfer means is responsive to the second signal of said end-of-zone detector means for transferring the information data read out from said memory means to said buffer store means.

8. The data processing system as claimed in claim 7, wherein said checking and repeat reading means includes multiplexer means operative in a first mode for enabling the transmission of information data read out from said memory means to said buffer store means in response to a first set of input control signals, and operative in a second mode of operation in response to a second set of control input signals for actuating a generator for generating given error code to be connected to said buffer store means, and transfer means responsive to the second signal of said character checking means and to that output of said detector means that the readout from the Nth memory zone has taken place, for effecting transfer of the given error code to said multiplexer means.

9. The data processing system as claimed in claim 3, wherein said character reading checking means comprises a first generator means for generating a pulse train of a given basic frequency, and a pulse counter responsive to the pulse train and to the data output of said reading means, for counting the number of pulses applied thereto during the presumed time taken to read a character, a second generator means for generating a given number of pulses at the given basic frequency corresponding to the time taken to read a character, a parallel-to-serial shift register having a plurality of parallel inputs and an output, a comparator coupled to the outputs of said counter and to receive the given number of pulses said second generator means, a decoder coupled to the outputs of said pulse counter for providing decoded output signals to the parallel inputs of said parallel-to-serial shift register, a transfer circuit responsive to the output of said comparator indicating that the number k of characters actually read is not less than "1," for transferring the output of said counter to said decoder for providing k output signals from its plurality of outputs to the parallel inputs of said parallel-to-serial shift register for enabling the application of k clock signal from its output, whereby the same information data as checked by said character reading checking means is stored k times at different addresses in a single memory zone of said memory means.

10. The data processing system as claimed in claim 9, wherein said comparator provides a second output signal indicating that the number k of characters actually read is less than "1," and there is further included an inverter coupled to said shift register, and an OR gate responsive to the second output of said comparator, and to the output of said inverter for generating a prevent output whereby the information data being reviewed by said character reading checking means is prevented from being transferred to said memory means.

11. The data processing system as claimed in claim 4, wherein there is a detector for determining the storing of information data in the Nth memory zone, and said zone length comparator means comprising N counters coupled to respective ones of said second addressing circuit, and a comparator having N inputs connected to corresponding ones of the outputs of said N counters, each of said N counters being coupled to the clock signals of said clock circuit, at least one of said N counters being coupled to said detector, said first and second output signals of said zone length comparator circuit being derived from said comparator.

* * * * *

UNITED STATES PATENT AND TRADEMARK OFFICE
CERTIFICATE OF CORRECTION

PATENT NO. : 4,132,978
DATED : January 2, 1979
INVENTOR(S) : Denis L. Mercier

It is certified that error appears in the above-identified patent and that said Letters Patent are hereby corrected as shown below:

Claim 9, line 62, insert --of-- between "pulses" and "said."

Signed and Sealed this

Twenty-second Day of May 1979

[SEAL]

Attest:

RUTH C. MASON
Attesting Officer

DONALD W. BANNER
Commissioner of Patents and Trademarks